United States Patent [19]
Thomson

[11] 3,825,747
[45] July 23, 1974

[54] SCANNER
[76] Inventor: E. Craig Thomson, 55 Livingston Rd., Wellesley, Mass. 02181
[22] Filed: May 21, 1973
[21] Appl. No.: 362,117

[52] U.S. Cl.................. 250/216, 250/222, 356/172
[51] Int. Cl. ............................................. H01j 3/14
[58] Field of Search..... 250/216, 217 CR, 239, 221, 250/272; 356/172, 4, 152

[56] References Cited
UNITED STATES PATENTS
| | | | |
|---|---|---|---|
| 3,334,236 | 8/1967 | Bacon | 250/217 CR |
| 3,474,252 | 10/1969 | Jacobsen | 250/216 |
| 3,554,653 | 1/1971 | Zielke et al. | 356/172 X |
| 3,567,948 | 3/1971 | Oke | 250/216 |
| R26,915 | 6/1970 | Cade | 250/239 |

Primary Examiner—Walter Stolwein

[57] ABSTRACT

Scanning apparatus in which a sensor is mounted within a transceiver casing and a single focusing means both forms a beam from a radiation source for delivery to a target and focuses a returned beam onto the sensor. A forward looking reflective surface is included in the path of one of the beams, causing that beam to be twice passed through the focusing means. The sensor faces the radiation source, thus avoiding the need for a separate lens for the returned radiation. The scanner is particularly useful in detecting retro-reflective targets.

10 Claims, 6 Drawing Figures

PATENTED JUL 23 1974          3,825,747

SCANNER

BACKGROUND OF THE INVENTION

1. Field of the Invention

This invention relates to radiation sensing apparatus and more particularly to a scanning device having both a radiation beam source and a sensing unit for detecting reflections of the beam from a target.

2. Description of the Prior Art

In the past optical scanners with separate transmitting and receiving units have been used to detect targets in the beam path having particular reflective qualities. The requirement for separate units generally increased both the complexity and the bulk of the equipment, and rendered the apparatus more difficult to operate. The receiver had to be aligned in the path of the returning light and positioned with the correct angular orientation; when the transmitter and sensing units were separate entities this had to be done every time one of them was moved.

More recently a coaxial scanner has been developed in which a transmitter and sensing unit are mounted in the same casing. A beam is produced from the rear of the casing and transmitted around the sensing unit and out the front of the casing. Reflected radiation is returned back into the casing where it is focused by a lens held in the front of the sensing unit and converged onto the sensor. Combining the units into a single casing produced a highly accurate device that was more compact than previously available sensors.

While considerably improved over older models, the present coaxial scanners are still complex, and can be further simplified. Their sensing units are also subject to background radiation entering from outside the scanner.

SUMMARY OF THE INVENTION

In the present invention, a transceiver scanner has a unitary focusing means, one portion of which is used to form a beam for transmission to a target and another portion of which is used to focus a light beam reflected back for the target onto a sensor. The focusing means includes a reflective surface positioned in the path of one of the beams to reflect the beam back for a second passage through the focusing means. Radiation from the source that eventually reaches the sensor undergoes one reversal of direction at the target and another at the reflective surface, terminating in a direction such that the sensor faces the source to receive the radiation.

In a particular embodiment a member is mounted on the rear of the focusing means and includes a surface forming the reflective surface, the member in addition serving to shade the sensor from direct illumination by the radiation source. Depending on the shape of the member an outgoing beam is formed which occupies a cross-sectional area less than the cross-sectional area of the focusing means, the portion of the focusing means not involved in forming the outgoing beam being used to focus a returned beam onto the sensor. Instead of a single member on the focusing means a plurality of members may be employed, the size, shape and placement of the members being selected in accordance with the strength of outgoing beam and detection efficiency for the returned beam desired.

In one embodiment the radiation source is located to the rear of the focusing means, which is preferably a single plano-convex lens, and the sensor is in front and facing backward towards the source. An outgoing beam is formed around a member mounted on the rear of the focusing means. That portion of the beam reflected back from a target that strikes the focusing means at points not occupied by the outgoing beam is partially focused and directed onto the reflective surface, where it is reflected back through the focusing means and fully focused onto the sensor. In another embodiment the radiation source is in front of the focusing means, and the sensor is to the rear and facing forward towards the source. In this embodiment an outgoing beam is formed by radiation from the source that traverses the focusing means a first time, is reflected off the reflective surface, and passes back through the focusing means a second time. The area of the outgoing beam is substantially equal to the area of the reflective surface. Radiation is focused onto the sensor from that portion of the beam reflected back from a target that strikes the focusing means out of alignment with the reflective surface.

The member providing the reflective surface is situated in the optical line between the radiation source and sensor to shade the sensor, and in addition its size and shape are selected to give a desired balance between the outgoing beam strength and the sensing capability for a returned beam. The member may be either symmetrical or assymmetrical with respect to the focal axis, and in one embodiment a plurality of discrete members are provided to increase the sensing efficiency. Depending on the disposition of the member, the outgoing beam may also be either symmetrical or assymmetrical about the focal axis.

The scanner is particularly sensitive to targets characterized by small-angle scattering of reflected radiation, such as retro-reflective surfaces. It may also be used to detect diffuse-reflecting targets, for which its construction produces a large depth of focus.

Other objects, features and advantages of the invention will be seen from the following detailed description, in conjunction with the drawing, in which.

DETAILED DESCRIPTION OF PARTICULAR EMBODIMENTS

Figures 1, 2:
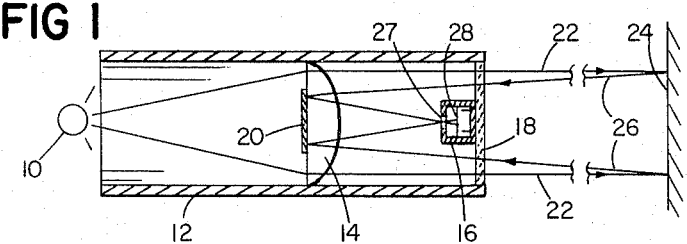
FIG. 1 is a diagrammatic illustration of a particular embodiment of the invention.
FIG. 2 is a sectional view showing one way of mounting the sensing unit.

The present invention employs a lamp 10 as a source of radiation within a scanner casing such as tube 12 that houses a radiation focusing means 14, and a radiation sensing unit 16. The focusing means 14 is preferably provided by a single lens which, as illustrated in FIG. 1, is as large as the inner diameter of the tube 12, with a plane surface facing the radiation source 10 at the rear, and a convex surface facing towards the front. The sensing unit 16 is mounted along the focal axis on a transparent glass plate 18 that keeps dust out of the tube. Lens 14 has deposited upon the central portion of its rear surface a member shown as disc 20, the forward-facing surface of which is reflective and the rearward facing surface opaque to radiation from source 10. Reflecting member 20 could also be provided separately from lens 14, as by mounting it in the casing 12 between the lens and radiation source 10, or a separate member could be provided to shade sensing unit 16 from radiation source 10. It is preferable, however, to combine both functions in a single element mounted on the lens as shown in the drawings.

The radiation source 10 is located approximately one focal length behind the lens 14, whereby light passing through the lens is formed into a substantially parallel beam. It may be desirable to place the radiation source 10 somewhat further to the rear in order to form a slightly convergent beam. As the reflecting member 20 is opaque to radiation transmitted from rear to front, an annular beam will be formed having a darkened interior portion corresponding approximately to the size of the member 20, which is made large enough to shade the sensing unit 16 from direct illumination by the radiation source 10. Outgoing radiation rays, indicated in FIG. 1 by numeral 22, are reflected back into the scanner from a target such as retro-reflective surface 24. The returning rays 26 travel back at a small angle of scatter characteristic of retro-reflective surfaces. That portion of the returning beam that strikes the lens 14 in optical alignment with reflecting member 20, where the lens is not occupied by the outgoing beam, is refracted through the lens 14 onto the reflective surface of member 20. These rays 26 are reflected off the member 20 and pass back through the lens, which focuses them onto the sensing unit 16. Passing through a small aperture 27 in the unit, the rays 26 strike a photosensitive surface 28 and initiate a signal that is brought out of the scanner through a pair of electrical leads (not shown). The sensing unit 16 is located about half a focal length in front of the lens 14; a slightly smaller distance is preferred because of the somewhat converging nature of the returning rays 26. As shown in FIG. 2, instead of being mounted on the front scanner plate 18, the sensing unit 16 may be held in an inner cylindrical tube 30 which is supported coaxially with the axis of tube 12 by three thin webs 32, 34, 36. The inner walls of the tube 12 may be dulled to reduce undesired radiation from entering the sensing unit 16.

Figure 3:
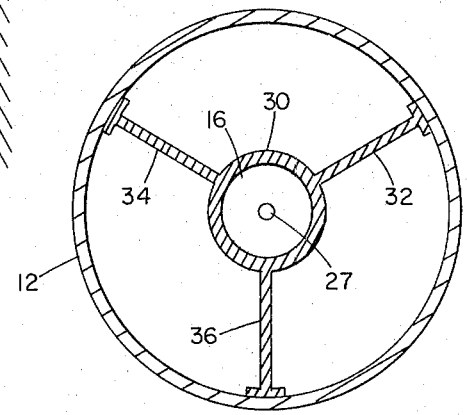
FIG. 3 is an illustrative perspective view of a scanner having additional reflecting areas on the focusing means.

In the embodiment of FIG. 1 only a portion of the lens 14 is used in forming any outgoing transmitted beam. Reflection of radiation onto the sensing unit 16 is accomplished for that portion of the returned radiation that either strikes the interior portion of lens 14 involved in forming the transmitted beam or strikes lens 14 at a sufficiently large angle to the lens axis to be refracted onto the reflective surface of member 20. The sensitivity of the scanner can be increased by adjusting the division of the lens into outgoing and returned beam portions in various ways. For example, as illustrated in FIG. 3, reflecting arms 38 extending outwardly from the reflecting member 20 may be deposited onto the rear of lens 14. A transmitted beam will be formed from radiation passing from source 10 between the arms 38. In addition to inwardly scattered return radiation is reflected off the arms 38 and focused onto the sensing unit 16. While a greater proportion of the returned beam is delivered to sensing unit 16 due to the greater interface between outgoing and returned beams in this embodiment, it will be seen that the originally transmitted beam is diminished by te presence of arms 38. Depending upon the ultimate use planned for the scanner, an appropriate balance between beam strength and detection efficiency can be designed.

Figure 4:
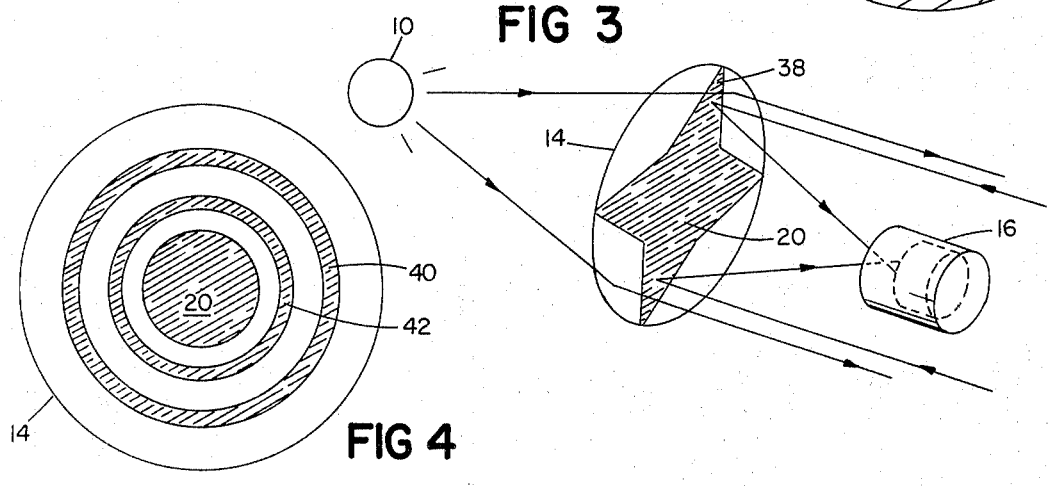
FIG. 4 is a rear view of a focusing lens having additional reflecting areas.

In FIG. 4 another arrangement is shown in which discrete concentric reflecting rings 40, 42 are deposited onto the rear of lens 14. Radiation passes out between the rings 40, 42, and return radiation is reflected from them onto the sensing unit 16. Additional modifications in the shape of the reflecting surface may be envisioned both symmetrical and assymmetrical. For example, member 20 may bisect the lens 14 into upper and lower portions, or member 20 may occupy one side only of the lens. Similarly, it is not essential that the radiation source 10 and sensor 16 be located on the focal axis, as an off-center portion of lens 14 may be used to form the outgoing beam.

Figure 5:
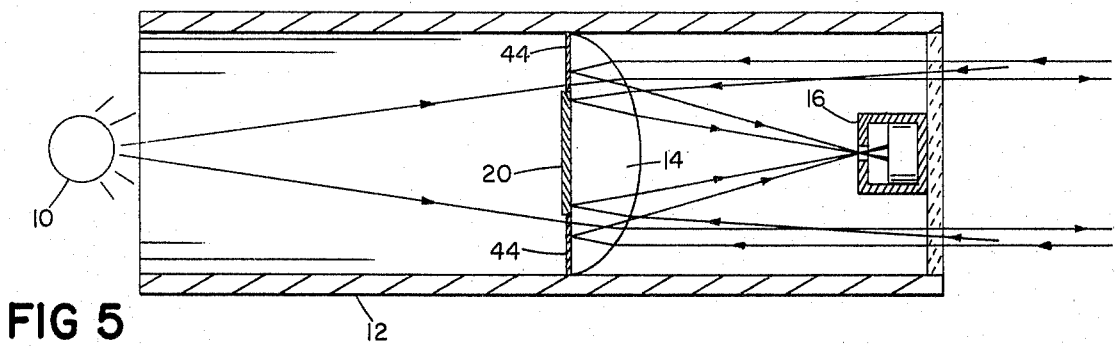
FIG. 5 is a diagrammatic illustration of a scanner having a one-way mirror deposited on the rear surface of the lens.

In another embodiment illustrated in FIG. 5, a semi-transparent mirror 44, adapted to transmit a certain proportion of radiation from the source 10 towards the front of the tube and to reflect returned radiation back trhough the lens 14 and onto the sensing unit 16, is placed on the rear of the lens 14 around the reflecting member 20. In this embodiment a high efficiency in sensing return radiation is achieved, in which virtually all radiation entering the scanner from a target is focused onto the sensing unit. However, mirror 44 does not fully transmit all the incident light from source 10.

The scanner of this invention achieves a high degree of compactness and simplicity. When the radiation source 10, lens 14 and sensing unit 16 are once aligned along the focal axis, no further alignment is necessary when the direction of the scanner is changed. Because of its sensitivity to small-angle scattering from a target, the scanner may be used to discriminate between retro-reflective targets and other surfaces; in its coaxial embodiment radiation retro-reflected from a target at a very close range can be recognized. The sensitivity of the photo-cell 28 may be selected such that the scanner can also detect diffuse-reflected radiation. In this mode the coaxial arrangement achieves a large depth of focus.

Figure 6:
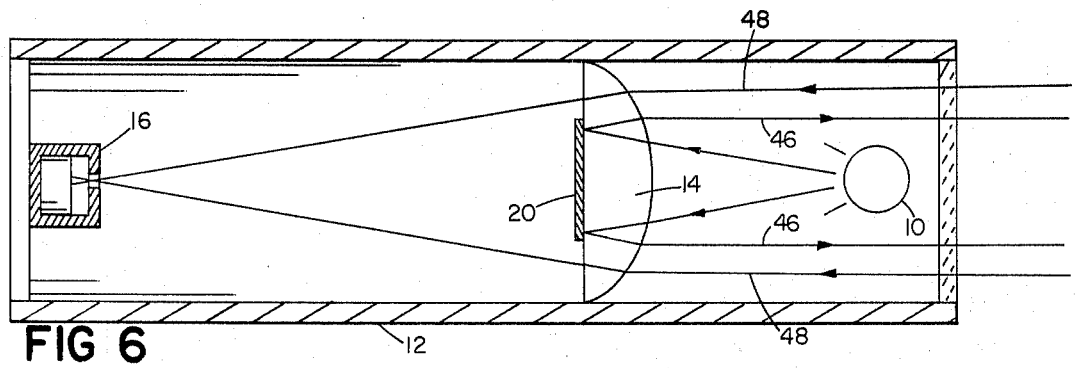
FIG. 6 is a diagrammatic illustration showing another embodiment of the invention.

While preferred embodiments of the invention have been shown and described, various modifications thereof may occur to those skilled in the art. For example, a scanner is shown in FIG. 6 in which the position of the radiation source 10 and the sensing unit 16 have been reversed with respect to the lens 14. The source 10 is displaced from the lens by about half a focal length, forming a substantially parallel outgoing beam 46 when radiation from the source 10 passes through the lens 14, is reflected off of member 20 and again traverses the lens 14 on its way out the tube. Returned radiation 48 that strikes the lens 14 out of focal alignment with the member 20 is focused onto the sensing unit 16, located approximately one focal length to the rear or slightly further away to compensate for the small divergence from a parallel beam of the return radiation 48. The sensing unit 16 is shaded from source 10 by the reflecting member 20, again making possible a very large signal to noise ratio.

It is therefore not intended that the invention be limited to the disclosed embodiments or details thereof, and departures may be made therefrom within the scope of the invention as defined in the claims.

What is claimed is:

1. A scanner comprising:
   a. a radiation source;
   b. a radiation sensor mounted facing said radiation source;
   c. focusing means mounted between said radiation source and radiation sensor, a member mounted on the rear of the focusing means and shading said sensor from direct illumination by said source, said member having a forward facing reflective surface, said focusing means directing an outgoing beam from said source towards a target in front of said focusing means, said focusing means adapted to focus onto said sensor a beam reflected back from a target and incident on said focusing means at points not occupied by said outgoing beam, and said forward facing reflective surface being disposed in the path of one of said beams.

2. A scanner according to claim 1 useful in the detection of a target having a retro-reflective surface.

3. A scanner according to claim 1 wherein said focusing means is adapted to form an outgoing beam having an unoccupied central portion.

4. A scanner according to claim 1, wherein said source is to the rear of said focusing means, said sensor is in front of said focusing means, and the cross-sectional area occupied by said outgoing beam is substantially equal to the cross-sectional area of said focusing means excluding the cross-sectional area of said shading member.

5. A scanner according to claim 1 wherein said source is in front of said focusing means, said sensor is to the rear of said focusing means, and the cross-sectional area occupied by said outgoing beam is substantially equal to the area of said reflective surface.

6. A scanner according to claim 1 wherein said focusing means is a plano-convex lens.

7. A scanner for casting radiation forward onto a target and sensing radiation reflected back from the target comprising:
   a. a light source;
   b. a plano-convex lens mounted in a casing approximately a focal length of said lens in front of said source;
   c. a light sensor mounted in said casing approximately one-half focal length of said lens in front of said lens; and
   d. a member on the rear of said lens having an opaque rear surface shading said sensing unit from said light source, said member also having a reflective front surface for reflecting a portion of the light returned from a target back through said lens onto said sensing unit.

8. A scanner according to claim 7 wherein said light sensor is mounted on a transparent plate at the front of the casing.

9. A scanner according to claim 7, including a plurality of discrete members on the rear of said lens having reflective front surfaces.

10. A scanner according to claim 7 wherein said member is a semi-transparent mirror for transmitting light from said source to a target and for reflecting light returned from a target back through said lens onto said light sensor.

* * * * *

UNITED STATES PATENT OFFICE
CERTIFICATE OF CORRECTION

Patent No. 3,825,747                    Dated July 23, 1974

Inventor(s) Elihu C. Thomson

It is certified that error appears in the above-identified patent and that said Letters Patent are hereby corrected as shown below:

Title Page, before "Filed:", insert --Assignee: Electronics Corporation of America, Cambridge, Mass.--

Column 4, line 5, change "te" to --the--;
         line 27, change "trhough" to --through--.

Signed and sealed this 29th day of October 1974.

(SEAL)
Attest:

McCOY M. GIBSON JR.                  C. MARSHALL DANN
Attesting Officer                    Commissioner of Patents